United States Patent
Savinov

(10) Patent No.: US 7,516,627 B2
(45) Date of Patent: Apr. 14, 2009

(54) METHOD FOR SEPARATING A KRYPTON-XENON CONCENTRATE AND A DEVICE FOR CARRYING OUT SAID METHOD

(76) Inventor: Mikhail Yurievich Savinov, Ul. 9-aya Parkovaya, 41-93, Moscow (RU) 105264

( * ) Notice: Subject to any disclaimer, the term of this patent is extended or adjusted under 35 U.S.C. 154(b) by 765 days.

(21) Appl. No.: 10/523,231

(22) PCT Filed: Oct. 7, 2003

(86) PCT No.: PCT/RU03/00431

§ 371 (c)(1),
(2), (4) Date: Jan. 24, 2005

(87) PCT Pub. No.: WO2004/045744

PCT Pub. Date: Jun. 3, 2004

(65) Prior Publication Data

US 2006/0000702 A1    Jan. 5, 2006

(30) Foreign Application Priority Data

Nov. 15, 2002   (RU) ............................. 2002130600

(51) Int. Cl.
*B01D 3/14* (2006.01)
*B01D 53/00* (2006.01)
*F25J 3/02* (2006.01)

(52) U.S. Cl. ............................ 62/644; 62/648; 62/925; 202/153; 202/154; 202/155; 202/158; 203/71

(58) Field of Classification Search .................. 62/644, 62/648, 925; 202/153–158; 203/71; 976/DIG. 381
See application file for complete search history.

(56) References Cited

U.S. PATENT DOCUMENTS

| 4,417,909 A | 11/1983 | Weltmer, Jr. |
| 6,351,970 B1 | 3/2002 | Hahn et al. |
| 6,662,593 B1 * | 12/2003 | Higginbotham et al. ....... 62/643 |

FOREIGN PATENT DOCUMENTS

| DE | 10000017 A1 | 6/2000 |
| FR | 2280954 | 2/1976 |
| RU | 2047062 C1 | 10/1995 |

* cited by examiner

*Primary Examiner*—Virginia Manoharan
(74) *Attorney, Agent, or Firm*—Houston Eliseeva LLP

(57) ABSTRACT

A krypton-xenon concentrate is first divided into krypton and xenon fractions in a preliminary rectifying column. Semi-volatile impurities are removed from each fraction, and production krypton and xenon are obtained from the refined fractions in krypton and xenon production columns. A recovered krypton flow is produced in a krypton recovery rectifying column. Reflux is formed in condensers-evaporators of rectification columns of the device in such a way that the formation of a solid phase is excluded. The operation of the rectification columns is initiated by supplying krypton to a contacting space.

4 Claims, 1 Drawing Sheet

Figure 1:
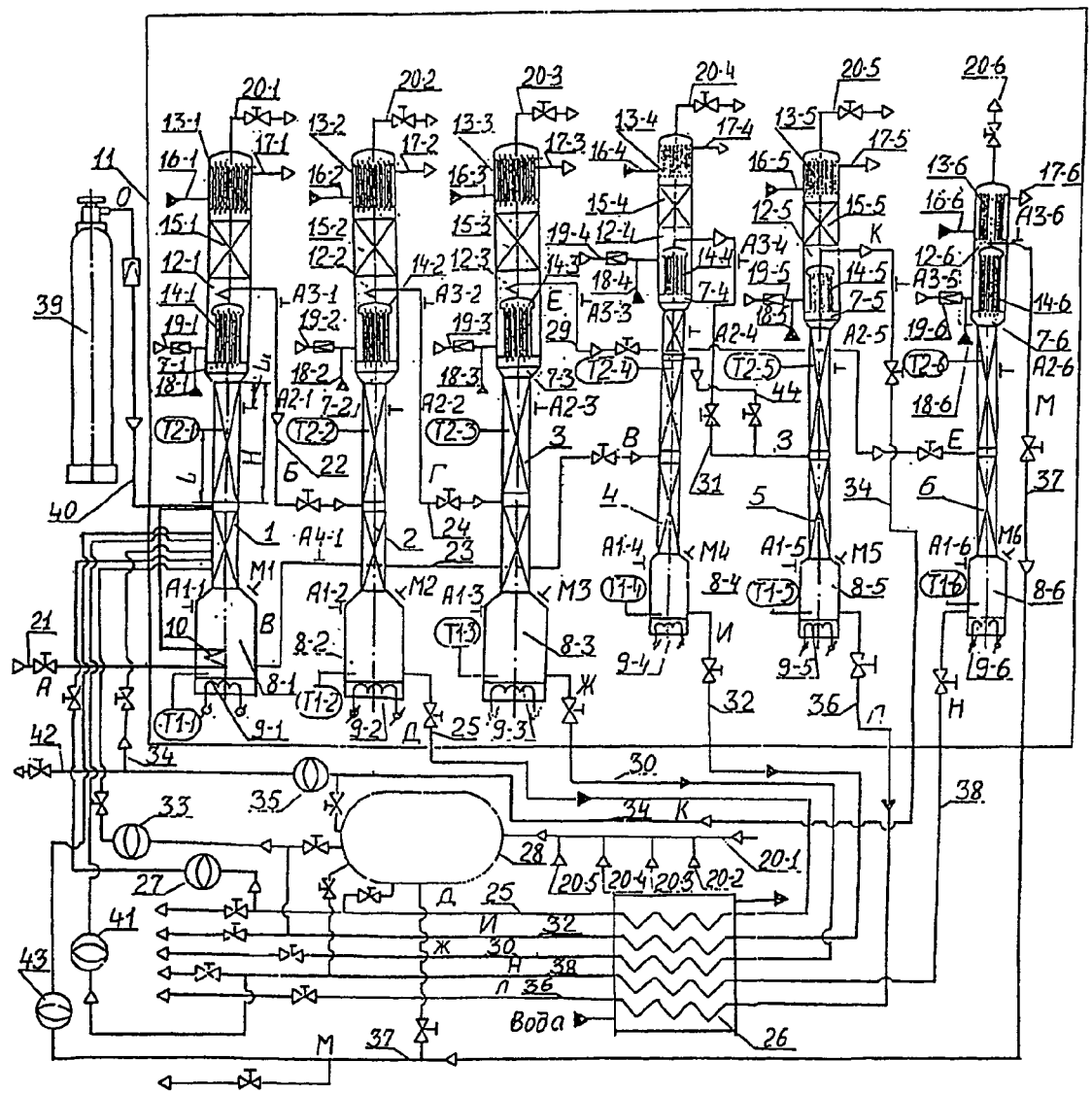

METHOD FOR SEPARATING A KRYPTON-XENON CONCENTRATE AND A DEVICE FOR CARRYING OUT SAID METHOD

FIELD OF THE INVENTION

The invention relates generally to cryogenic engineering. More specifically, the invention pertains to refining and separating a krypton-xenon concentrate obtained with the aid of air-fractionating equipment, which concentrate can be used in chemical, gas, and oil producing industries.

BACKGROUND OF THE INVENTION

Known in the art is a method for refining and separating a krypton-xenon concentrate comprising the steps of preparing the krypton-xenon concentrate from a weak krypton-xenon mixture, which is pre-purified from hydrocarbons, using a method of low temperature rectification, refining the krypton-xenon concentrate to remove fluorine- and/or chlorine-containing impurities, and subsequently dividing the matter into high-purity krypton and high-purity xenon in a rectifying column. Purification of the krypton-xenon concentrate to remove fluorine- and/or chlorine-containing impurities in the known method is provided through chemical adsorption at a temperature comprised predominately between 450° and 550° C. on a solid adsorbent comprising, for the most part, more than 50% of phyllosilicates. Carbon dioxide and water are thus formed, which are removed by absorption of the carbon dioxide and the water in one of two reversing absorbers using molecular sieves. Oxygen traces are removed by contacting with a copper-nickel catalyst.

The known method has drawbacks with regard to high energy capacity and high specific quantity of metal required due to the use of high temperature processes in cryogenic technology. Further, it is impossible to obtain especially pure krypton and xenon in one column simultaneously.

The closest to the present invention, in terms of technical essence, is an adsorption-rectification method for separating gases with the use of freezing steps, which provides for liberating xenon and krypton from a gas mixture containing krypton, xenon, argon, and nitrogen. According to the known method, xenon is absorbed in a silica gel absorber from a gas flow pre-purified from carbon dioxide and moisture, with the remaining gas mixture directed first to a rectifying column for preliminary krypton separation and then to a krypton column. The xenon fraction is liberated in the process of reactivation of the absorber, and is intermittently directed to a nitrogen-cooled freezing apparatus. In the apparatus, while the xenon and krypton freezes, an appreciable portion of nitrogen with an admixture of krypton is removed from the fraction, and added to the gas flow at the inlet of the column for krypton pre-separation. The xenon concentrate obtained after fusing the cryogenic residual is purified to remove nitrogen/krypton remainders in the xenon column.

The drawbacks of the known method are its discontinuity associated with the use of a freezing apparatus being filled with xenon fractions at regular intervals, additional expenditures of a coolant and electric energy on the alternating freezing and heating of the xenon fractions, as well as the impossibility of obtaining especially pure krypton and xenon, when starting with the presence in a base mixture of, for example, fluorine/chlorine-containing compounds.

Also known is an apparatus for purifying and separating a krypton-xenon concentrate, comprising an outfit-pipeline-connected low-temperature rectifying column for producing a krypton-xenon concentrate, a vessel filled with a solid sorbent containing phyllosilicates, for removing fluorine- and/or chlorine-containing impurities from the concentrate at a temperature of between 450° and 550° C., a pair of reversing absorbers, a reaction vessel with a copper-nickel catalyst, and a rectifying column for the production of high-purity krypton and xenon. The device is disadvantageous in that it has a high energy capacity and a high specific quantity of metal, and because of the impossibility of obtaining in one column simultaneously especially pure krypton and xenon.

Also known is a device for separating gases, comprising two adsorbents filled with molecular sieves, a silica gel adsorbent, a xenon freezing means, a preliminary krypton separation rectifying column, and krypton and xenon rectifying columns connected via pipelines with the outfit. The device is disadvantageous with respect to its discontinuity of operation associated with the use of freezing means intermittently filled with xenon fractions, additional expenditures of a coolant and electric energy in cooling and heating the freezing means as well as the impossibility of obtaining especially pure krypton and xenon, when starting with, for example, fluorine- and/or chlorine-containing impurities in a base mixture.

SUMMARY OF THE INVENTION

An object of the invention is to enhance the efficiency of especially pure krypton and xenon by maximizing their maximal recovery from a base mixture.

A method for separating a krypton-xenon concentrate, which is pre-purified from hydrocarbons, comprises the steps of separating a krypton-xenon concentrate flow in a preliminary rectifying column to form a krypton fraction flow and a xenon fraction flow, delivering and separating the krypton fraction flow in a production krypton column to form a production krypton flow and a blowing gases flow of the krypton column, delivering and separating the xenon fraction flow in a production xenon column to form a production xenon flow and a blowing gases flow of the xenon column. A distinguishing feature of the invention is that the xenon fraction flow before the delivery and separation in the production xenon column is further separated by rectification in a xenon rectifying column to form a purified xenon fraction flow, which is collected from an upper zone of a concentration part of the xenon rectifying column and fed for separation to the production xenon column, and a high-boiling admixtures flow. The krypton fraction flow, before the delivery and separation in the production krypton column is further separated by rectification in krypton rectifying column to form a purified krypton fraction flow being supplied for separation to the production krypton column, and an intermediate admixtures flow. The blowing gases flow of the krypton column is further separated by rectification in a krypton recovery column to form a low-boiling admixtures flow and a recovered krypton flow. The recovered krypton flow and the blowing gases flow of the xenon column are directed for separation to the preliminary rectifying column and, more importantly, the rectifying columns are brought into operation with the krypton fed into the columns' contact space, and reflux is formed in evaporating condensers of the rectifying columns under conditions precluding formation of solids.

An object of the invention is to enhance efficiency in producing especially pure krypton and xenon as a result of their maximal recovery from a base mixture.

This object is achieved by a device for separating a krypton-xenon concentrate, which is pre-purified to remove hydrocarbons. The device comprises a krypton-xenon concentrate line of flow feeding a preliminary rectifying column, a production krypton column with a blowing gases line of flow of the krypton column in communication via a krypton fraction line of flow with the preliminary rectifying column, a production xenon column with a blowing gases line of flow of the xenon column in communication via a xenon fraction line of flow with the preliminary rectifying column, each of which is provided with an evaporating condenser and a thermal converter. A distinction resides in that in the xenon fraction line of flow, a provision is made for a xenon rectifying column with a branch pipe in an upper zone of its concentration part. The xenon rectifying column is completed with a feeding line of the xenon rectifying column, a purified xenon fraction line of flow connected with the branch pipe in the upper zone of the concentration part, and a high-boiling admixtures line of flow. The xenon rectifying column line of flow is connected with the xenon fraction line of flow. The purified xenon fraction line of flow is connected with an outlet pipe of the purified xenon fraction and with a production xenon column feeding line. On the krypton fraction line of flow there is provided a krypton rectifying column equipped with a krypton rectifying column feeding line, a purified krypton fraction line of flow, and an intermediate admixtures line of flow. The krypton rectifying column feeding line is connected with the krypton column line of flow. The purified krypton fraction line of flow is connected with a production krypton column feeding line. On the krypton column blowing gases line of flow, additionally installed is a krypton recovery column provided with a krypton recovery column feeding line, a low-boiling admixtures line of flow, and a recovered krypton line of flow. The krypton recovery column feeding line is connected with the krypton column blowing gases line of flow and, along with this, the xenon column blowing gases line of flow, the high-boiling admixtures line of flow, the intermediate admixtures line of flow, the low-boiling admixtures line of flow and the recovered krypton line of flow are in communication with a purge collecting device and with a contact part of the preliminary rectifying column via pressure increasing devices. The concentration parts of the columns are further equipped with anticipatory assay nipples and the thermal converters are provided above the supply lines of the feeding flows of the columns at a distance $L=(0.4-0.8)H$, wherein H is a height of the concentration part of a respective column. The evaporating condensers of the columns comprise a closed space dividing the boiling surface of a coolant and a reflux vapors condensation surface filled with a working medium. The closed spaces of the evaporating condensers of the preliminary rectifying column, the production krypton column, the production xenon column, the krypton rectifying column and the xenon rectifying column are partially filled with packing, and the working medium is a mixture of oxygen and krypton while the working medium in the closed space of the evaporating condenser of the krypton recovery column is nitrogen, and the preliminary rectifying column is connected via a pipeline with a source of krypton.

The method for separating a krypton-xenon concentrate can be realized in the device schematically shown in the drawing.

BRIEF DESCRIPTION OF THE DRAWING FIGURE

FIG. 1 is a schematic illustration of a device for separating a krypton-xenon concentrate.

DETAILED DESCRIPTION OF THE INVENTION

The device (installation) of FIG. 1 comprises a preliminary rectifying column 1, a krypton rectifying column 2, a production krypton column 3, a xenon rectifying column 4, a production xenon column 5, and a krypton recovery column 6. Each and every rectifying column has an evaporating condenser 7-1 to 7-6 at a top thereof and a still 8-1 to 8-6 at a foot thereof provided with an electric heating element 9-1 to 9-6. Still 8-1 of the preliminary rectifying column 1 additionally contains an evaporator 10.

Every evaporating condenser 7-1 to 7-6 has a closed space 12-1 to 12-6 to be filled with a working medium. A top portion of a surface of the closed space has heat interaction with a surface 13-1 to 13-6 of a boiling coolant wherein a bottom portion—interacts with a surface 14-1 to 14-6 of reflux vapors condensation. Moreover, a middle portion of the closed space of the evaporating condensers 7-1 to 7-5 is filled with packing 15-1 to 15-5.

All the evaporating condensers have branch pipes communicated with liquid coolant inlet lines 16-1 to 16-6, and branch pipes communicated with coolant vapors outlet lines 17-1 to 17-6. The closed spaces of the evaporating condensers have branch pipes communicated with lines 18-1 to 18-6 for delivery of the working medium in a liquid state or with lines 19-1 to 19-6 for delivery of the working medium in a gaseous state as well as branch pipes connected by lines 20-1 of 20-5 allowing the working medium to run out into a purge collection device 28. The preliminary rectifying column 1 has a branch pipe in a middle portion thereof, connected by a pipeline via the evaporator 10 with a line 21 of a krypton-xenon concentrate flow (flow A), in a top portion—a branch pipe connected by a line 22 of a krypton fraction flow (flow B) with the branch pipe in the middle portion of the krypton rectifying column 2 and in a bottom portion, still 8-1 has a branch pipe connected by a line 23 of a xenon fraction flow (flow C) with the branch pipe in the middle portion of the xenon rectifying column 4.

The krypton rectifying column 2 has a branch pipe in a top portion, connected by a line 24 of a purified krypton fraction flow (flow D) with a branch pipe in a middle portion of the production krypton column 3 and in a bottom portion, in still 8-2—a branch pipe connected by a line 25 of an intermediate admixtures flow (flow E) via an evaporator 26 and a pressure increasing device 27 with a branch pipe provided in a bottom portion of a contact space of the preliminary rectifying column 1 or downstream of the evaporator 26 with a purge collection device 28 or with an exit of the installation.

The production krypton column 3 has a branch pipe in a top portion, connected by a line 29 of a krypton column blowing gases (flow F) with a branch pipe in a middle portion of the krypton recovery column 6 and in a bottom portion, in still 8-3, a branch pipe connected by a line 30 of a production krypton flow (flow G) via the evaporator 26 with the exit of the installation.

The xenon rectifying column 4 has a branch pipe in a top portion, connected by a line 31 of a purified xenon fraction flow (flow H) with a branch pipe in a middle portion of the production xenon column 5, in an upper zone of a concentration part—a branch pipe connected with a line 31 by a line 44, and in a bottom portion in still 8-4, a branch pipe connected by a line 32 of a high boiling admixtures flow (flow I) via the evaporator 26 and a pressure increasing device 33 with a branch pipe positioned in the bottom portion of the contact space of the preliminary rectifying column 1 or downstream of the evaporator 26 with the purge collection device 28 or with the exit of the installation.

The production xenon column 5 has a branch pipe in a top portion, connected by a line 34 of a xenon column blowing gases flow (flow J) with the purge collection device 28 or via a pressure increasing device 35 with a branch pipe provided in the bottom portion of the contact space of the preliminary rectifying column 1 and in a bottom portion, in still 8-5, a branch pipe connected by a line 36 of a production xenon flow (flow K) via the evaporator 26 with the exit of the installation.

The krypton recovery column 6 has a branch pipe in a top portion, connected by a line 37 of a low boiling admixtures flow (flow L) with the purge collection device 28 or via a pressure increasing device 43, with a branch pipe provided in the bottom portion of the contact space of the preliminary rectifying column 1 or with the exit of the installation, and in a bottom portion, in a still 8-6, a branch pipe connected by a line 38 of a recovered krypton flow (flow M) via the evaporator 26 with the purge collection device 28 or via a pressure increasing device 41 with a branch pipe provided in the bottom portion of the contact space of the preliminary rectifying column 1 or with the exit of the installation.

To bring the device into operation, a source 39 of krypton is provided in the device, is the source 39 being connected by a krypton supply line 40 (flow N) with the preliminary rectifying column 1.

All the rectifying columns comprise thermal converters T1-1 to T1-6 for measuring liquid temperatures in a still, thermal converters T2-1 to T2-6 for measuring medium temperatures, positioned in the section of an upper (concentration) part above an inlet of flows A, B, C, D, F, H at a distance (L) making up 0.4 to 0.8 of the height (H) of the concentration part of a respective column, nipples A 1-1 to A 1-6 for assay pipes outlet from the steam zone of the still, samplers A2-1 to A2-6 of a vapour phase outlet, positioned at a distance $L_1$=0.5 to 1.0 m from the head of the concentration part and nipples M1 to M6 of a pulse pipe outlet toward pneumatic converters. Nipples A3-1 to A3-6 for the assay pipes outlet are likewise positioned on lines of flows B, D, F, H, J, L, respectively, and nipple A4-1 on the line of flow C. All the rectifying columns and low-temperature pipelines are contained in an insulating enclosure 11 and filled with a heat-insulating material; perlite powder, for example.

The method for separating a krypton-xenon concentrate is carried out in the following manner.

The vacuum pretreated contact spaces of rectifying columns 1 to 6 are supplied with a krypton flow (N) along the line 40 from the krypton source 39, maintaining a pressure after a reductor from 0.15 to 0.3 MPa, predominantly 0.2 MPa. At the same time liquid nitrogen is supplied along lines 16-1 to 16-6 to the boiling surfaces of coolant 13-1 to 13-6 of evaporating condensers 7-1 to 7-6, the nitrogen being utilized as a coolant that boils under a pressure of from 0.11 to 0.15 MPa, and generated steam is removed along lines 17-1 to 17-6. Upon completion of a step of freezing the boiling surfaces, which is characterized by an abrupt reduction in the amounts of the steam removed along the lines 17-1 to 17-6, closed spaces 12-1 to 12-5 of evaporating condensers 7-1 to 7-5 are supplied with, as working medium, an oxygen-krypton mixture containing 40-90% of krypton in a gaseous state along lines 19-1 to 19-5, or in a liquid state along lines 18-1 to 18-5; closed space 12-6 of evaporating condenser 7-6 is supplied, as working medium, with gaseous nitrogen along line 19-6, or liquid nitrogen—along line 18-6. At the time of supplying the oxygen-krypton mixture in the gaseous state, a mixture pressure is maintained from 0.2 to 0.7 MPa, predominantly 0.3 MPa. While feeding the gaseous nitrogen, the inlet pressure is maintained at 2.4-3.0 MPa, predominantly at 2.5 MPa. Upon condensation of required amounts of the working medium, which is determined by its level in the lower portion of the surface of the closed space, its delivery is terminated. While feeding the working medium in the liquid state, the steam generated in freezing is condensed in the upper portion of the surface of the closed space. Simultaneously with emergence of the working medium liquid in the lower portion of the surface of the closed space, there begins condensation of krypton and a further freezing of the rectifying columns. With the liquid krypton appearing in stills 8-1 to 8-6, the freezing process is completed. Electric heating elements 9-1-9-6 are then supplied with electric power, and the columns are switched to a cycle of "endless reflux" by changing the flow times of the coolant. At the same time, in the closed space of the evaporating condensers, a pressure is maintained permitting to establish the operating pressure in the contacting space of the rectifying columns, on one hand, and the temperature of the surface of reflux vapours condensation above that of krypton's freezing point, on the other, thus preventing the ice from freezing over.

A krypton-xenon concentrate produced on air-fractionating installations, purified from hydrocarbons, is supplied along line 21, substantially at a pressure of between 0.2 and 0.25 MPa into the preliminary rectifying column 1, in which the reflux is a krypton condensate. The krypton-xenon concentrate incorporates krypton Kr, xenon Xe with admixtures, such as nitrogen $N_2$, oxygen $O_2$, argon Ar, neon Ne, helium He, hydrogen $H_2$, carbon oxide CO, tetrafluoromethane $CF_4$, hexafluoroethane $C_2F_6$, monofluorotrichloromethane (freon 11) $CFCl_3$, difluorodichloromethane (freon 12) $CF_2Cl_2$, to mention but few. As a result of a rectification process in the still 8-1 there is collected a xenon fraction containing all of the xenon and admixtures which are high boiling as regards to the krypton, for example $C_2F_6$, $CFCl_3$, $CF_2Cl_2$, etc., as well as a little purposely maintained amount of krypton (2-5 vol. %) and at the head of the column—is the krypton fraction containing the krypton, admixtures which are volatile as regards the krypton and also $CF_4$ and other admixtures having a boiling temperature close to that of krypton. The rectification process is conducted according to the indices of a pneumatic converter connected to the nipple M1, thermal converters T1-1 and T2-1, assays taken from nipples A1-1, A3-1, A4-1 and an assay taken from sampler A2-1. The thermal converter T2-1 being mounted at a distance L=(0.4–0.8)H above a flow A inlet, where H is here the height of the concentration part of the preliminary rectifying column, is located in a zone of maximum concentration alteration and, therefore, is highly sensitive to a change in conditions. Thus the assay from the sampler A2-1 is anticipatory for taking measures to preclude, for example, xenon uptake to a condensation surface.

In the closed space 12-1, with the krypton content of 80 vol. %, the pressure is maintained at 0.25 MPa, a factor that ensures a minimal temperature difference, as to a tendency for krypton not to freeze up, being roughly 2K. This low pressure in a closed space is ascribed to the use, as working medium, of a mixture of krypton and oxygen with the separation of components on the packing 15-1, with the result that the boiling temperature of the mixture in the lower portion of the closed space exceeds the oxygen condensation temperature in the upper portion of the closed space by 18 K. Prevention of conditions for ice formation on the condensation surface 14-1 and also on condensation surfaces 14-2 to 14-6 in other evaporating condensers prevents the possibility of an installation being stopped in connection with the filling-in of rectifying columns, taking the chill off and start-up thereof.

From the head of the preliminary rectifying column 1 along line 22, the krypton fraction flow is directed to the krypton rectifying column 2, where the reflux is a krypton condensate. Inasmuch as tetrafluoromethane $CF_4$ and other admixtures are semi-volatile with respect to krypton, having at a given pressure, a boiling temperature higher than a krypton boiling temperature, they are concentrated in the still 8-2 of the column in combination with krypton, and can be withdrawn from the installation on the line 25 of the intermediate admixtures flow via the evaporator 26 to be utilized as a target product. For example, krypton can be used as a filler gas for window multiple glass units, or directed to the purge collection device 28, or returned through the pressure increasing device 27 into the contact area of the preliminary rectifying column 1.

From the head of the column 2, a purified krypton fraction flow is withdrawn along the line 24, already devoid of admixtures which are semi-volatile with respect to krypton and directed to the middle portion of the krypton production column 3 wherein the reflux is a krypton condensate. As a result of the rectification process, the production krypton is collected in the still 8-3, and is taken out of the device along the line 30 of the production krypton flow. The krypton column blowing gases flow is withdrawn from the head of the krypton production column 3 along the line 29, which contains krypton and all the relative-to-krypton volatile materials, and directed to the middle portion of the krypton recovery column 6. As mentioned above, in the closed space 12-6 of the evaporating condenser 7-6 nitrogen is present at a pressure of about 2.5 MPa, wherein krypton is in the contact space of the column. Therefore, on starting up the installation, the reflux in the krypton recovery column 6 is a krypton condensate being formed on the condensation surface 14-6 with no solids.

As the krypton column blowing gases flow is fed to the krypton recovery column 6, the pressure therein increases. The pressure is then reduced to the former value by removing non-condensing gases along the line 37 of the low boiling admixtures flow and at the same time decreasing the nitrogen pressure in the closed space 12-6, which is effected by increasing the boiling surface 13-6 of the coolant by raising its level. While lowering the nitrogen pressure in the closed space 12-6 to 0.2 to 0.25 MPa, the reflux in the krypton recovery column 6 already consists of a mixture of low boiling liquids ($N_2$, $O_2$, Ar) while a krypton content in the line 37 of the low boiling admixtures does not exceed 0.3 vol. %. And the supply of the coolant to the evaporating condenser 7-6 is transferred to the line 16-6 directly into the closed space 12-6 with the removal of the coolant steam along the line 20-6.

The low boiling admixtures flow M from the head of the krypton recovery column 6 is taken from the installation or directed to the purge collection device 28, or via the pressure increasing device 43 it is returned into the contact space of the preliminary rectifying column 1. From the still 8-6 the flow H of recovered krypton is withdrawn via the evaporator 26, from the installation, or directed to the purge collection device 28, or returned via the pressure increasing device 41 to the contact space of the preliminary rectifying column 1.

From the still 8-1 of the preliminary rectifying column 1, the xenon fraction flow C is directed through the line 23 to the middle portion of the xenon rectifying column 4. In the closed space 12-4 of the evaporating condenser 7-4, the pressure of the oxygen-krypton mixture is gradually increased to 2.5 MPa, which is effected by reducing the boiling surface 13-4 of the coolant by lowering its level. With a pressure reaching ~2.5 MPa, xenon reflux is formed on the condensation surface 14-4, wherein krypton becomes a non-condensing gas. As a result of the rectification process in the still 8-4 all the admixtures are concentrated together with a part of xenon, which are present in a xenon fraction flow and have a boiling temperature higher than the xenon boiling temperature, including $C_2F_6$, $CFCl_3$, $CF_2Cl_2$, etc. From the still 8-4 the high boiling admixtures flow I is withdrawn along the line 32 via the evaporator 26, from the installation as a final product, for example, for using the xenon as a filler gas for window multiple glass units, or to be returned via the pressure increasing device 33 to the contact space of the preliminary rectifying column 1, or to be directed to the pure collection device 28.

From the head of the xenon rectifying column 4 along the line 31, or from the upper zone of the concentration part of the xenon rectifying column 4 along the line 44, the purified xenon fraction flow H containing xenon and krypton alone is directed to the middle portion of the production-xenon column 5 wherein the reflux is a krypton condensate. As a result of the rectification process, production xenon gathers in the still 8-5, and is withdrawn from the installation along the line 36 via the evaporator 26. The flow K of blowing gases of the production-xenon column 5 is withdrawn from the head of production-xenon column 5 along the line 34, and is directed to the purge collection device 28, or returned via the pressure increasing device 35 to the contact space of the preliminary rectifying column 1.

On collection of the purified fraction from the upper zone of the concentration part of the xenon rectifying column 4 along the line 44 in the xenon rectifying column 4, the reflux is a krypton condensate, a factor that permits reducing the operating pressure of the krypton-oxygen mixture in the closed space 12-4 of the evaporating condenser 7-4 from 2.5 MPa to 0.2-0.25 MPa.

In the case of a need to terminate the process, all of the contents of the contact spaces of columns 1, 2, 3, upon evaporation, are let go to the columns 4 and 6 to proceed along the lines 32 and 38, respectively, to the purge collection device 28; it is then withdrawn via the pressure increasing device 35 along the line 42, from the installation to a reservoir for subsequent treatment. On disposal of the contents of the contact spaces of the columns into the purge collection-device 28, a krypton-oxygen mixture is let out of the closed spaces 15-1 to 15-5 of the evaporating condensers, respectively, along the lines 20-1 to 20-5, whence it is directed from the installation, via the pressure increasing device 35 along the line 42, to a separate reservoir for subsequent purposeful use.

The claimed method and device for separating a xenon-krypton concentrate practically with any admixtures allow one to achieve a recovery index, as to krypton and xenon, of no less than 0.99995 with the contained admixtures in production krypton and xenon of not greater than $10-10^{-11}$ parts per volume.

The claimed method for separating a krypton-xenon concentrate and the device for carrying out the same make it possible to raise efficiency of obtaining highly pure krypton and xenon due to their maximum recovery and the continuity of the processes.

What is claimed is:

1. A method for separating a krypton-xenon concentrate comprising the steps of:

separating a krypton-xenon-concentrate flow in a preliminary rectifying column to produce a krypton-fraction flow and a xenon-fraction flow;

rectifying the xenon-fraction flow in a xenon rectifying column to produce a purified xenon-fraction flow and a high-boiling-temperature-admixtures flow;

producing a purified xenon-fraction flow from an upper zone of the xenon rectifying column;

separating the purified xenon-fraction flow in a production-xenon column to produce a production-xenon flow and a xenon-column blowing gases flow;

rectifying the krypton-fraction flow in a additional krypton rectifying column to produce a purified krypton-fraction flow and an intermediate admixtures flow;

separating the purified krypton-fraction flow in a production-krypton column to produce a production-krypton flow and a krypton-column blowing gases flow;

rectifying the krypton-column blowing gases flow in a krypton recovery rectifying column to produce a recovered krypton flow and a low-boiling-temperature-admixtures flow; and directing the xenon-column blowing gases flow and the recovered krypton flow into the preliminary rectifying column for separation, wherein the preliminary rectifying column, the xenon rectifying column, the krypton rectifying column, and the krypton recovery rectifying column are put into operation with krypton supplied to a respective contacting space in each said rectifying column, and wherein said rectifying columns comprise evaporating condensers.

2. The method of claim 1, wherein reflux formation in the evaporating condensers of said rectifying columns occurs under conditions precluding its formation of a solid phase.

3. A device for separating a krypton-xenon concentrate comprising:

a preliminary rectifying column comprising a contact section and a concentration section with an anticipatory assay nipple, the preliminary rectifying column being fed in by a krypton-xenon concentrate line and fed out by a xenon-fraction line and a krypton-fraction line;

a xenon rectifying column in communication with the preliminary rectifying column, comprising a xenon concentration unit and a concentration section with an anticipatory assay nipple, an upper zone of the xenon concentration unit being coupled to a purified xenon-fraction-outlet branch pipe, the purified xenon-fraction-outlet branch pipe being coupled to a purified xenon-fraction line of a production-xenon column, the xenon rectifying column being fed in by the xenon-fraction line and fed out by the purified xenon-fraction line and a high-boiling-temperature-admixtures line;

a krypton rectifying column in communication with the preliminary rectifying column comprising a concentration section with an anticipatory assay nipple, the krypton rectifying column being fed in by the krypton-fraction line and fed out by a purified krypton-fraction line and an intermediate admixtures line;

the production-xenon column in communication with the xenon rectifying column comprising an evaporating condenser, a thermal converter, and a concentration section with an anticipatory assay nipple, the production-xenon column being fed in by the purified xenon-fraction line and fed out by a xenon-column blowing gases line, wherein the thermal converter is mounted more than the distance between 0.4H and 0.8H above a feed point of the purified xenon-fraction line, wherein H is a height of the concentration section;

a production-krypton column in communication with the krypton rectifying column, comprising an evaporating condenser, a thermal converter, and a concentration section with an anticipatory assay nipple, the production-krypton column being fed in by the purified krypton-fraction line and fed out by a krypton-column blowing gases line, the thermal converter being mounted more than the distance between 0.4H and 0.8H above a feed point of the purified krypton-fraction line, wherein H is a height of the concentration section;

a krypton recovery column in communication with the production-krypton column comprising a concentration section with an anticipatory assay nipple, the krypton recovery column being fed in by the krypton-column blowing gases line and fed out by a recovered krypton line and a low-boiling-temperature-admixtures line;

a purge collection unit, the purge collection unit being coupled to the xenon-column blowing gases line, the high-boiling-temperature-admixtures line, the intermediate admixtures line, the low-boiling-temperature-admixtures line and the recovered krypton line; and pressure increasing units, wherein the xenon-column blowing gases line, the high-boiling-temperature-admixtures line, the intermediate admixtures line, the low-boiling-temperature-admixtures line and the recovered krypton line are coupled, via the pressure increasing units, to a contact section of the preliminary rectifying column.

4. The device of claim 3, wherein each column comprises an evaporating condenser, the evaporating condenser comprising a closed space filled with a working medium, the closed space separating the boiling surface of a coolant and a condensing surface of reflux vapors;

wherein the closed spaces of the evaporating condensers of the preliminary rectifying column, the production-krypton column, the productions-xenon column, the krypton rectifying column, and the xenon rectifying column are partially filled with packing;

wherein the working medium for these columns is a mixture of oxygen and krypton;

wherein in the closed space of the evaporating condenser of the krypton recovery column the working medium is nitrogen; and wherein the preliminary rectifying column is coupled with a krypton source via a pipe.

* * * * *